Nov. 17, 1970 JAMES E. WEBB 3,541,312
ADMINISTRATOR OF THE NATIONAL AERONAUTICS
AND SPACE ADMINISTRATION
NON-INTERRUPTABLE DIGITAL COUNTING SYSTEM
Filed Dec. 30, 1966 3 Sheets-Sheet 1

INVENTOR.
ROBIN A. WINKELSTEIN
BY
ATTORNEYS

INVENTOR.
ROBIN A. WINKELSTEIN

BY

ATTORNEYS

Nov. 17, 1970 JAMES E. WEBB 3,541,312
ADMINISTRATOR OF THE NATIONAL AERONAUTICS
AND SPACE ADMINISTRATION
NON-INTERRUPTABLE DIGITAL COUNTING SYSTEM
Filed Dec. 30, 1966 3 Sheets-Sheet 3

INVENTOR.
ROBIN A. WINKELSTEIN
BY
ATTORNEYS

United States Patent Office 3,541,312
Patented Nov. 17, 1970

3,541,312

NON-INTERRUPTABLE DIGITAL COUNTING SYSTEM

James E. Webb, Administrator of the National Aeronautics and Space Administration, with respect to an invention of Robin A. Winkelstein, La Crescenta, Calif.

Filed Dec. 30, 1966, Ser. No. 606,462
Int. Cl. H03k 21/08
U.S. Cl. 235—92 6 Claims

ABSTRACT OF THE DISCLOSURE

A noninterruptable digital counting system including a master multistage binary counter, whose maximum propagation time is longer than the period between successive input pulses, continuously supplied to the counter. A slave binary counter of equal stage length which is selectively coupled to the master counter and the source of input pulses, so that both counters have the same nominal count and both respond to the same input pulses. Logic control circuitry, for decoupling the slave from the master counter, preferably when the stages of both are in a quiescent state. The logic control circuitry also includes controls to disrupt the supply of input pulses at a selected time instant, so that the count therein at such instant represents the count also present in the master counter.

The invention described herein was made in the performance of work under a NASA contract and is subject to the provisions of Section 305 of the National Aeronautics and Space Act of 1958, Public Law 85–568 (72 Stat. 435; 42 U.S.C. 2457.)

BACKGROUND OF THE INVENTION

Field of the invention

This invention relates to a frequency monitoring system and, more particularly, to a system for continuously counting frequencies without interruption, while providing a read out count of the countered frequencies at any desired instant in time.

Description of the prior art

The use of counters to count or monitor frequencies in the form of input pulse trains is wide spread in electronic systems, used both in commercial and military applications. Counters are presently available which are capable of counting pulses, supplied at very high frequencies. Many of these counters are also provided with circuitry which enable the reading out of the counter's content. Generally, counters used in conjuction with digital computers, are multibit counters, in which the state of each binary stage represents a different bit of a multibit number, with the input stage of the counter representing the least significant bit. As the bit length of the counter increases, the maximum counter carry propagation time, representing the maximum possible time required for the counter to settle down after an input pulse, increases proportionately. The maximum counter carry propagation time represents the time during which a rippling phenomenon occurs in which each stage or bit changes from one state to another and affects a succeeding stage. Such as a phenomenon occurs when the count in a binary counter changes from a maximum to zero.

When the frequency of the input pulses is low, so that the pulse period between successive input pulses is greater than the maximum counter carry propagation time, it is possible to read out the content of the counter between input pulses, while the counter is at aquiescent state or condition. In such a case, the stream of input pulses may be continuous, with readout occurring after the counter settles down, in response to one pulse and, before a subsequent pulse is received. However, if the bit length of the counter is long, and the input pulse frequency is high, the maximum counter carry propagation time may be several times the period of the input pulse. In such a situation it is not possible to read out the counter's content between input pulses since, the counter may not reach a quiescent condition or settle down before a subsequent pulse is applied. The only conventional way of reading out the counter is by interrupting the supply of input pulses. Then, after the counter settles down, its content is read out after which time the supply of input pulses is resumed. However, in some applications it is not possible to interrupt the supply of input pulses to the counter, which must be continuous. In such cases, other then the conventional technique must be employed to read out the counter's content. It is toward a system to accomplish readout from a counter, continuously supplied with input pulses that the present invention is directed to.

OBJECTS AND SUMMARY OF THE INVENTION

Accordingly, it is a primary object of the present invention to provide a new noninterruptable digital counting system.

Another object of the present invention is the provision of a system for reading out the content of a counter which is continuously supplied with input pulses.

A further object of the present invention is to accurately read out the content of a counter, whose maximum counter carry propagation time is greater than the period between input pulses, without interrupting the supply of the input pulses to the counter.

Still another object of the present invention is to provide a new relatively simple system for reading out the content of a multibit counter which is continuously supplied with input pulses, the time period between input pulses being less than the maximum counter carry propagation time.

These and other objects of the invention are achieved by providing a noninterruptable digital counting system, which includes a multibit counter, continuously supplied with input pulses. For explanatory purposes, this counter will hereafter be referred to as the "master counter." The system includes a second counter, hereafter referred to as the "slave counter" and control logic circuitry, the functiton of which is to control the response of the slave counter to the input pulses, continuously supplied to the master counter, as well as, to the states of the binary stages of the master counter.

Briefly, the master counter continuously counts the input pulses supplied thereto. Prior to the time when the count in the master counter is to be read out without interrupting the supply of input pulses thereto, a first control signal is supplied to the control logic circuitry of the system to cause the slave counter to respond to the input pulses which are supplied to the master counter. Thus, both counters respond to the same input pulses. However, the count in the two counters may differ. Then, a second control signal is generated, in response to which the slave counter is tied to the master counter so that the states of the binary stages of the master counter are transferred to the slave counter. As a result, the count in both counters is nominally the same and, since each stage in the slave counter is tied and therefore is driven to the state of its corresponding stage in the master counter.

Thereafter the slave counter is separated from the master counter. However since the slave counter continues to respond to the same input pulses that the master counter responds to, even though the two counters are separated from one another, the count in the slave counter increases in synchronism with the count in the master counter. Consequently, the count in the slave counter is the same as the count in the master counter, after being separated and as long as the two counters respond to the same input pulses. Then, just prior to the time when the count in the master counter is to be read out, another control signal is supplied which interrupts the supply of input pulses to the slave counter at the exact time when the count in the master counter is desired. After the slave counter condition, the count therefrom is read out. However, since the supply of input pulses is only interrupted to the slave counter and not to the master counter, the master counter is free to continue to respond to each and every one of the input pulses supplied thereto. A subsequent readout operation may be initiated when the slave counter is again enabled to respond to the input pulses and thereafter be tied to the master counter as hereinbefore described.

In a preferred embodiment of the invention, the slave counter is disconnected from the master counter at a time when both the stages of both counters are at a quiescent condition.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
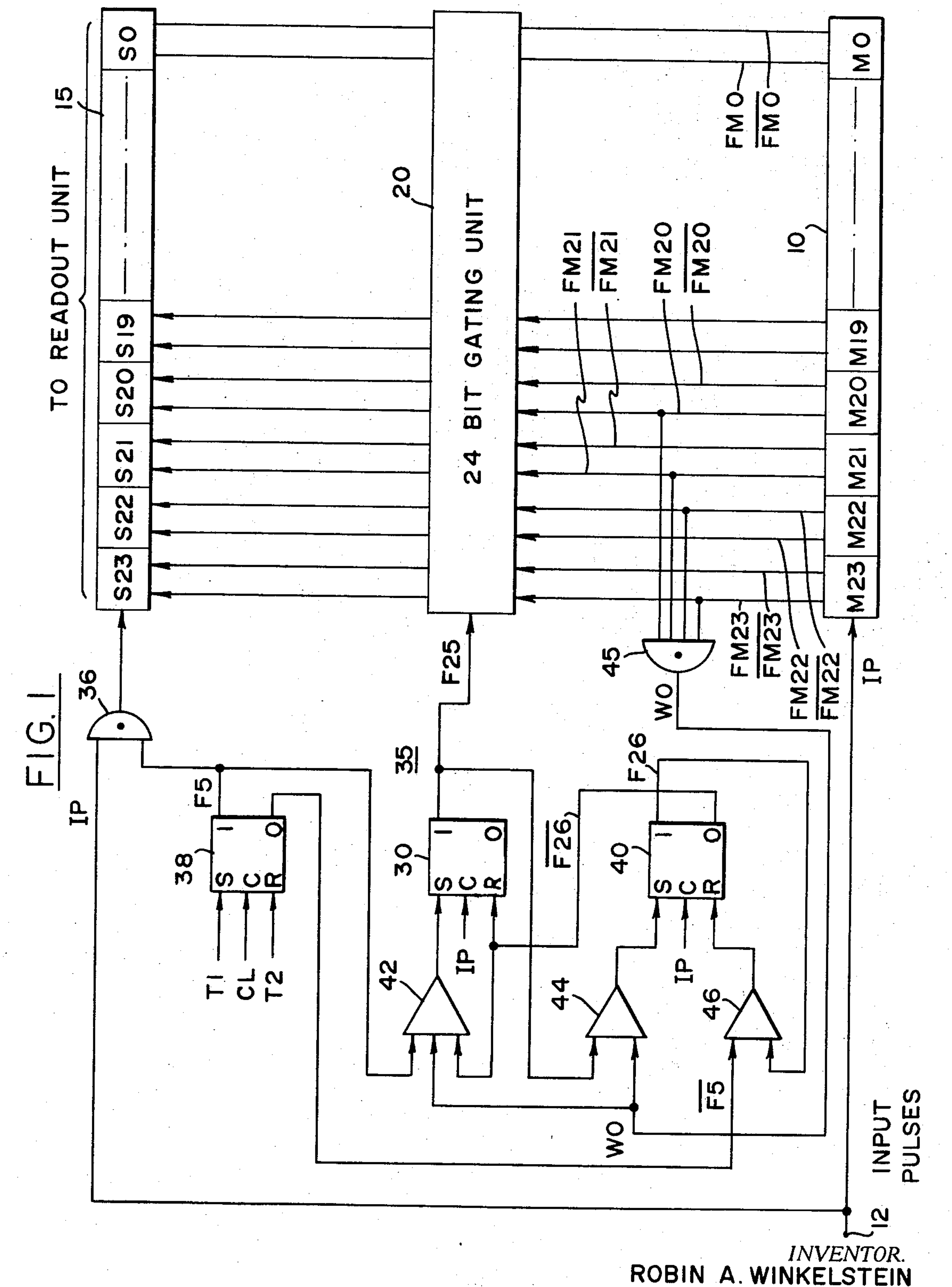
FIG. 1 is a block diagram of a preferred embodiment of the invention.

Reference is now made to FIG. 1 which is a block diagram of a preferred embodiment of the non-interruptable digital counting system of the present invention. Therein numeral 10 designates a master counter, shown for explanatory purposes as comprising of 24 stages, designated M0–M23, M23 representing the least significant stage or bit to which input pulses from a terminal 12 are supplied. The input pulses, hereafter designated IP, are assumed to be supplied from a system incorporating the counting system of the present invention, which in addition supplies control pulses, as well as, clock signals. Assuming that the input pulses are supplied at the rate of 4 megacycles (mc.) the period of each input pulse is 0.25 microsecond (μs.), which as is appreciated by those familiar with the art, is too short an interval for present day 24 bit counters to achieve an acquiescent state in response to an input pulse if each of the 24 stages undergoes a change of state, such as occurs when the count in counter 10 is a maximum and all the stages are reset to a 0 state in response to an input signal. That is, when a rippling phenomenon or ripple propagates from one end of the counter to the other. Thus, conventional techniques for reading out master counter 10, between input pulses, cannot be employed.

In order to read out counter 10 without interrupting the supply of input pulses thereto, the system of the present invention includes a second counter, hereafter referred to as the slave counter 15, which also consists of 24 stages designated S0–S23 respectively. Each of the stages of master counter 10 is assumed to comprise of a flip-flop with two outputs connected to a 24 bit gating unit 20, which is in turn connected to two inputs of each of the stages of slave counter 15. The two output lines of each stage, such as M23, of counter 10 are designated by the stage designation and the stage designation bar, preceded by the letter F such as FM23 and $\overline{\text{FM23}}$. FM23 and $\overline{\text{FM23}}$ are true and false respectively, when state M23 is in a set state, while being false and true respectively, when stage M23 is in a reset state.

Figure 2:
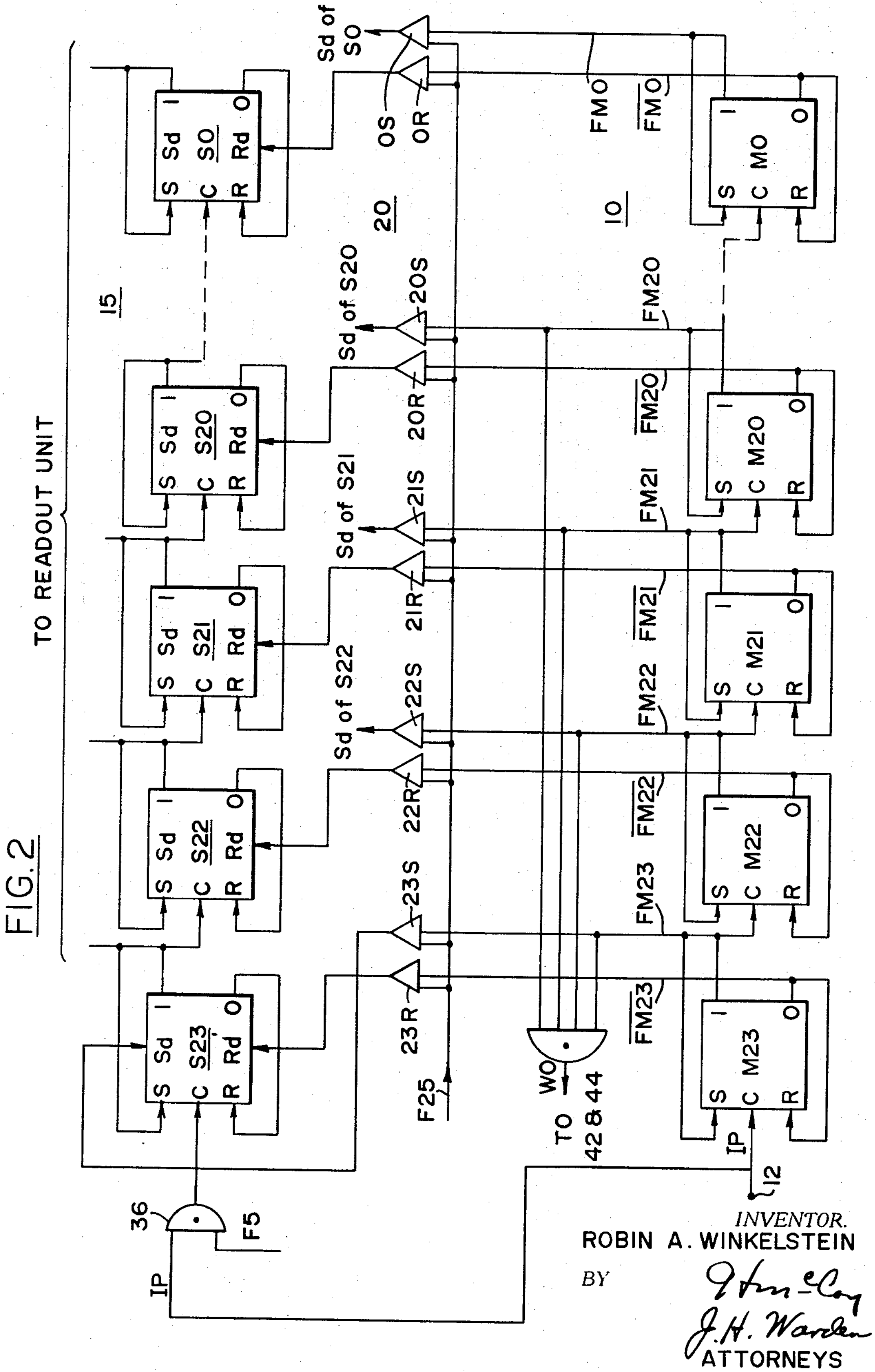
FIG. 2 is a block diagram showing certain portions of the circuitry of FIG. 1 in greater detail.

FIG. 2 to which reference is made herein is a more detailed block diagram of master counter 10, slave counter 15 and the 24 bit gating unit 20. As seen from FIG. 2, each stage of master counter 10 comprises of a flip-flop which has two complementary outputs labeled 1 and 0. When the stage is in the set state, the 1 output is true or positive so that the output line associated therewith is also true. Correspondingly, the 0 output is false, so that the output line connected thereto is similarly false. Conversely, when the stage is in a reset state, the 1 output is false and 0 output is true. Each of the stages of the master counter 10 has three inputs designated S, C and R. Signals to input C cause the stage to change states depending upon the static level of the signals at inputs S and R. The flip-flop changes state immediately following a negative going transition of the signals at input C, i.e. from a true level to a false level. If the signal at input C is a positive pulse train, the state will change only after the trailing edge of a pulse.

Signal levels at inputs S and R determine what action if any the stage will take upon an activating signal at input C. When the signals at inputs S and R are both true the flip-flop will remain as it was without changing state. A false signal at input S allows the flip-flop to set, when activated by a negative going pulse at input C. On the other hand, a false signal at input R allows the flip-flop to reset when activated by a negative going pulse at input C.

As seen from FIG. 2, the 1 output of each stage is connected to the S inputs thereof while the 0 output is connected to the R input thereof, thereby causing each state to change state every time the C input is activated. This occurs because a set state, returns a false signal to the R input, causing the flip-flop to reset upon the next activation of input C. Conversely, a reset stage, return a false signal to input S causing the flip-flop to set when input C is next activated. The 1 and 0 output of each stage, such as M23, are connected to FM and $\overline{\text{FM}}$ output lines, such as FM23 and $\overline{\text{FM23}}$. All of the output lines of the stages of counter 10 are connected to the 24 bit gating unit 20, while the 1 output of each stage is connected to the C input of a succeeding stage in the sequence of stages, forming counter 10.

The stages of slave counter 15 designated S0–S23 are similar to the stages of the master counter 10. However, in addition, each of the stages in the slave counter 10 includes two additional inputs designated S*d* and R*d*. Signals of these inputs, cause the stage to act independently of signals at inputs S, C and R. A false signal at input S*d* causes the stage to be set, while a false signal at input R*d* causes the stage to be reset. Only when both inputs S*d* and R*d* are true is the stage affected by input signals at the other three inputs S, C and R.

The 24 bit gating unit 20 comprises of 48 NAND gates designated, 0S, 0R, etc., up to 23S and 23R. The number associated with the designation of each gate indicates which stage the gate is associated with, while the letter at the end of the designation indicates to which of the two additional inputs of each stage in counter 15 the output of the gate is supplied. Thus, for example, NAND gate 23S is associated with stages M23 and S23 of the two counters, while its output is connected to the S*d* inputs of stage 23. Similarly gate 23R is associated with the same two stages, with its output being supplied to the R*d* input of stage S23. One input of gate 23S is connected to output line FM23 while one input of gate 23R is connected to the $\overline{\text{FM23}}$ output line of stage M23. Similarly, each of the other gates has one input connected to one of the output lines of the stage in the master counter associated therewith.

In addition, each of the NAND gates of unit 20 has one input connected to receive a control pulse on a control line F25, which as shown in FIG. 1 represents the 1 output of a flip-flop 30, assumed to form part of a logic control unit 35. The logic control unit 35 is also assumed to include an AND gate 36 the ouput of which is supplied to the least significant stage of slave counter 15. One input of AND gate 36 is connected to input terminal 12 to be supplied with the input pulses, IP, while the other input of gate 36 is connected to the 1 output of flip-flop 38 by an output line F5.

Briefly, when F25 is true the gates in unit 20 are enabled, coupling each stage of the slave counter 15 to a corresponding stage in the master counter, to assume the state thereof. Thus, when F25 is true it represents a coupling control signal. On the other hand, when F25 is false, the gates in 20 are disabled so that two counters are disconnected or decoupled from one another. Thus, when F25 is false it represents a decoupling control signal. Similarly, when F5 is true, gate 36 is enabled to supply IP pulses from terminal 12 to counter 15. However, when F5 is false gate 36 is disabled, blocking the supply of IP pulses to counter 15. The levels of F5 and F25 are controlled by the states of flip-flops 38 and 30 respectively.

In operation, to read out master counter 10 flip-flop 30 is set so that F25 is true, coupling counter 15 to master counter 10. Also, flip-flop 38 is set to enable gate 36 which enables the supply of pulses to slave counter 15. Flip-flop 38 may be set after flip-flop 30 or before as is the case in the arrangement, diagrammed in FIG. 1. Thus, when both F5 and F25 are true, both counters respond to the same input pulses IP. In addition, slave counter 15 is tied to master counter so that the stages of counter 15 assume the states of corresponding stages in counter 10. Consequently, the nominal count in both counters is the same.

Thereafter a control pulse resets flip-flop 30 which result in F25 being false, decoupling slave counter 15 from 10. However, since both counters respond to the same input pulses, the count in both will continue to be the same. Then at the time that the count in the master counter is desired, gate 36 is disabled, disrupting, only the supply of any additional pulses to slave counter 15. The count in counter 15 represents the desired count since, up to such time, both counters counted the same pulses so that at the desired time both had the same count. In the preferred embodiment diagrammed in FIG. 1, both the decoupling of the two counters and the coupling thereof are chosen to occur when the stages thereof are in quiescent conditions.

In the preferred embodiment diagrammed in FIG. 1, the logic control unit 35, in addition to flip-flops 30 and 38 includes a third flip-flop 40, which, like flip-flops 30 and 38, has 1 and 0 outputs and three inputs designated S, C and R. Each of the flip-flops operates in a manner similar to that described in conjunction with the stages of the master counter 10. That is, when a negative going pulse is received at the C input, the flip-flop is set if the S input is also false, while being reset if the R input is false. When set, the one output of the flip-flop is true and the zero output is false. Conversely, if the flip-flop is in a reset state, the one and zero outputs are false and true respectively.

In the arrangement diagrammed in FIG. 1, all the outputs of the three flip-flops are utilized except the 0 output of flip-flop 30. As previously explained, the 1 output of flip-flop 38 is connected by means of output line F5 to gate 36, while the 1 output of flip-flop 30 is connected by means of line F25 to the 24 bit gating units 20. The 1 output of flip-flop 38 is also connected to 1 input of a NAND gate 42, the output of which is connected to the S input of flip-flop 30. The 0 output of flip-flop 40 is connected by means of an output line designated $\overline{\mathbf{F26}}$ to another input of gate 42 as well as to the R input of flip-flop 30. The third input of gate 42 as well as one input of a NAND gate 44 are connected to the output of a four input AND gate 45. The 1 output of flip-flop 30 is connected to the other input of NAND gate 44, the output of which is connected to the S input of flip-flop 40.

The 1 output of flip-flop 40 is connected by means of an output line F26 to one input of a NAND gate 46, the other input of which is connected to the 0 output of flip-flop 38 by means of an output line $\overline{\mathbf{F5}}$. The output of NAND gate 46 is connected to the R input of flip-flop 40. The C inputs of each of flip-flops 30 and 40 is connected to respond to the input pulses designated IP, while the C input of flip-flop 38 is connected to receive clock signals designated CL, from the system with which the present noninterruptable digital counting system of the invention, is assumed to be associated. Similarly, such system provides the S and R inputs of flip-flop 38 with control signals, designated T1 and T2 respectively.

Initially, the three flip-flops 30, 38 and 40 of the control unit 35 are in a reset state. Then, whenever it is desired to read out the count in counter 10 without interrupting the supply of pulses thereto, a first negative going control pulse T1 is supplied to the S input of flip-flop 38. Then, when the next clock signal CL is supplied to the C input of flip-flop 38, the flip-flop 38 is flipped to a set state, thereby providing a true level on the output line F5. As a result, gate 36 is enabled so that the slave counter 15 starts counting the input pulses IP which are also supplied to the master counter 10. However, it should be different from that in the master counter.

Subsequently, when a predetermined combination of states of a selected group of least significant stages of the master counter 10 is present, it is sensed by the input lines of AND gate 45, the output of AND gate 45 designated WO is true. As a result, the three inputs to NAND gate 42 are true, thereby causing the gate to provide a false output to the S input of flip-flop 30. Then, when the negative going edge of one of the input pulses IP is supplied to the C input of flip-flop 30, flip-flop 30 is driven to a set state, so that the output line F25 thereof is true. This enables the various NAND gates in units 20 as hereinbefore described. As a result, the slave counter 15 is tied to the master counter 10, with each stage in the slave counter 15 assuming the state of the corresponding stage in the master counter 10. And, since both counters are now supplied with the same input pulses (since gate 36 is assumed to be enabled), the slave counter and the master counter will advance in synchronism. That is, the count in both will increase at the same rate, so that the count in the slave counter 15 is identical with that in the master counter 10.

Thereafter, when the particular combination of states of the least significant stages, tied to AND gate 45 again occurs, the AND gate 45 again provides a true output WO which enables NAND gate 44 to provide a false output to the S input of flip-flop 40. Consequently, when the negative going edge of the next input pulse is supplied to the C input of flip-flop 40, flip-flop 40 is driven to a set state. As a result, the level of the output line $\overline{\mathbf{F26}}$ is false, so that when a subsequent input pulse is supplied to the C input of flip-flop 30, the flip-flop 30 is driven to a reset state resulting in a false level on the output line F25. Such false level disables all of the NAND gates in unit 20 and consequently the slave counter 15 is disconnected from the master counter 10. However, since the two counters respond to the identical input pulses, the count in the slave counter 15 will continue to be identical with that in master counter 10 even though the two are disconnected from one another.

Then, when it is desired to readout the content of the master counter 10, at an instant in time when the negative going edge of a clock signal is to be supplied, just prior to such time, a T2 signal is supplied to the R input of flip-flop 38. As a result, the R input is false so that when the negative going edge of the clock pulse is received, i.e. at the instant that the count is desired, the C and R inputs of flip-flop 38 are false. As a result, flip-flop 38 is driven to a reset state which results in a false level on the output line F5, in turn disabling gate 36 so that additional input pulses IP cannot be supplied to the slave counter 15. That is, at the instant that the count of the master counter 10 is desired the slave counter 15 is inhibited from increasing the count thereof. And, since until that instant both counters count the same input pulses with the counts in both being identical, it should be appreciated that the final count in the slave counter 15 after the disabling of gate 36 represents the count in master counter 10 at such instant. After the slave counter 15 is given enough time to settle down, the count therein is read out by a readout unit (not shown) to which the 1 outputs of the various stages of slave counter 15 may be connected.

Figure 3:
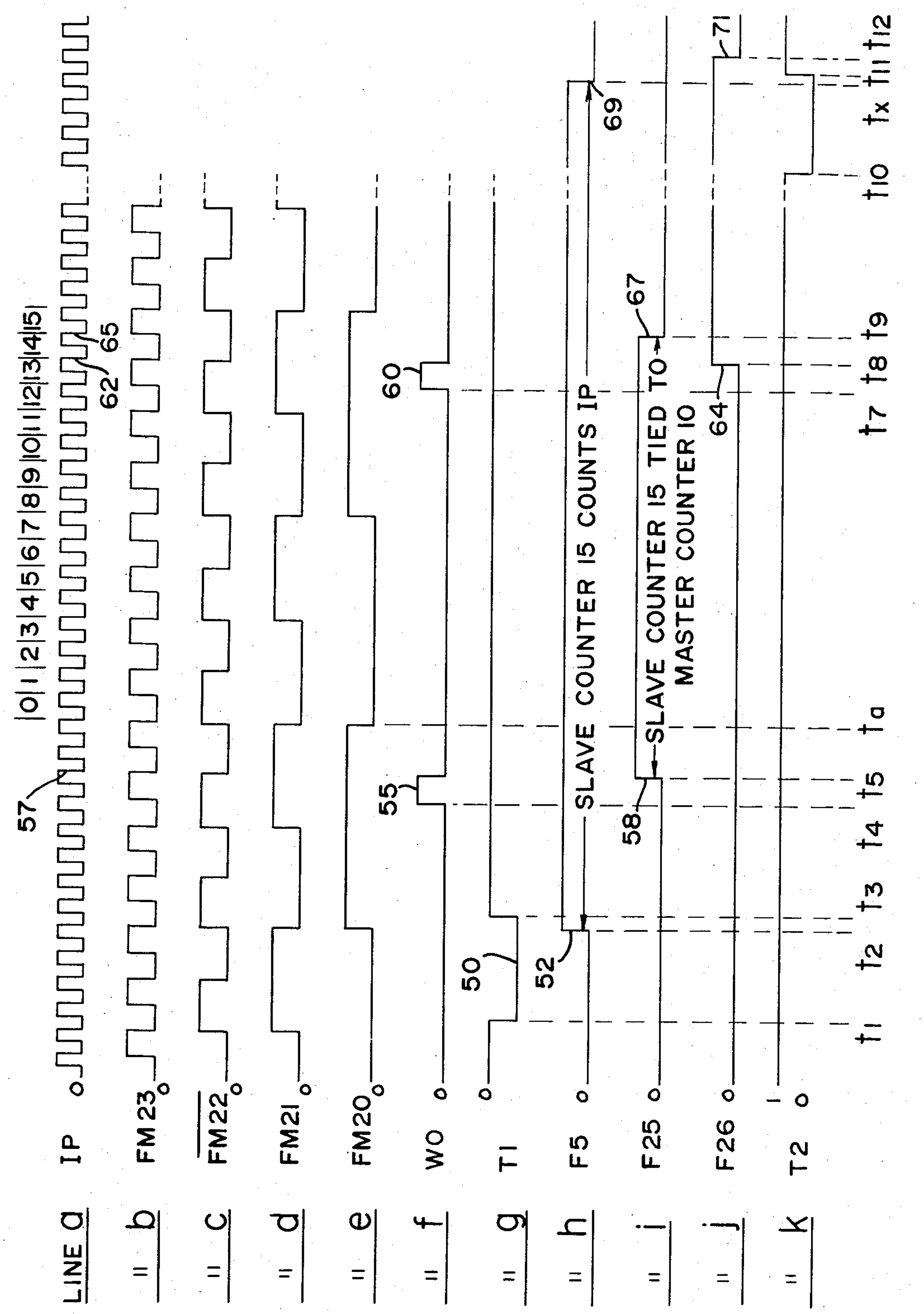
FIG. 3 is a diagram of waveforms, useful in explaining the present invention.

The teachings hereinbefore disclosed may best be summarized in conjunction with FIG. 3 which is a waveform diagram in which the input pulses IP are diagrammed in Line *a*, while Lines *b* through *e* represent the waveforms or levels on the output lines FM23, FM21 and FM20 respectively. Line *f* represents the output of AND gate 45 while Line *g* represents the level of the T1 signal supplied to the S input of flip-flop 38. Lines *h, i* and *j*, represent the levels of the output lines F5, F25 and F26 of flip-flops 38, 30 and 40 respectively. Line *k* represents the level of the second control signal T2, assumed to be supplied to the R input of flip-flop 38.

As is appreciated by those familiar with the art, the least significant stage M23 changes state in response to the trailing edge of each of the input pulses IP, while the next stage M22 changes state in response to every other input pulse. The fourth least significant stage, M20 changes state in response to each eighth input pulse, so that a transition from a true level to a false level occurs in response to the trailing edge of every sixteenth pulse of the input pulses. Such a transition of states from set to reset is indicated in FIG. 3 to occur at the time *ta*.

When stage M20 changes from a set to a reset state, it may affect the next stage M19 which in turn may affect each of the succeeding stages all the way to M0 if all of the stages are in their set state. Thus, a major carry propagation signal may assume to occur each time stage M20 changes from a set state to a reset state, thereby producing a rippling signal through the succeeding stages M19 through M0. Such rippling signal occurs each time the first four stages are switched from their set state to their reset state, i.e. when the count represented by the first four stages is switched from that representing 15 to one representing 0.

In order to disconnect slave counter 15 from master counter 10 after such rippling or major carry propagation signal had a change to advance through all the stages and enable the stages to settle down, in accordance with the preferred teachings of the present invention, the gate 45 is enabled to provide the true output WO to initiate the disconnecting of slave counter 15 from master counter 10 when the count represented by the first four stages represents 13. That is, the WO output is true during the thirteenth input pulse period after a major carry propagation signal has propagated past the fourth stage FM20. This is sufficient time to have allowed the previous major carry propagation signal to be completely propagated through stages M19 through M0, so that all the stages are in their quiescent state.

Reference is again made to FIG. 3. Let it be assumed that a readout cycle is initiated at a time *t1* by supplying flip-flop 38 with a false T1 signal designated in Line *g* by numeral 50. At a later time *t2*, when the trailing edge of the clock pulse is assumed to be supplied to the C input of flip-flop 38 (FIG. 1), flip-flop 38 is driven to its set state. As a result, the level of output line F5 is switched from false to true as indicated in Line *h* by numeral 52. When F5 is true, gate 36 is enabled so that the input pulses IP are supplied to the slave counter 15 to be counted therein. Pulse T1 ends at a time *t3*. From the foregoing description and diagram of FIG. 3 it should be appreciated that after time *t3*, even though slave counter 15 counts the input pulses, the two counters are disconnected from one another since during such time, the level of output line F25 is false and therefore the gates in units 20 are disabled.

Since herebefore, the major propagation signal is defined as the signal created by the change of state of stage M20 from set to reset, a condition occurring once every sixteen pulse periods, in one embodiment of the invention, the inputs to gate 45 (FIG. 1) are connected to the outputs of stages M20 through M23 so that only during the thirteenth period, after a major carry propagation signal is created, is gate 45 enabled to provide a WO signal, designated in Line *f* by numeral 55. This is accomplished by connecting the FM20, FM21, $\overline{FM22}$ and FM23 to the inputs of gate 45. That is, only when stages M20, M21 and M23 are in a set state and stage M22 in a reset state, representing a number 13 are all the inputs to AND gate 45 true so that the output WO thereof is true. In FIG. 3 the output of gate 45 represented by WO is true between times *t4* and *t5*. At time *t5* the least significant stage M23 switches from a set to a reset state and therefore disables the gate 45. During the interval between time *t4* and *t5*, when WO is true, the three inputs to NAND gate 42 (FIG. 1) are true so that a false output is supplied to the S input of flip-flop 30. As a result, when the trailing edge of the next input pulse, designated in FIG. 3, Line *a* by numeral 56 is supplied, the S and C inputs of flip-flop 30 are both false, switching the flip-flop to a set state, thereby providing a true output on output line F25. This is designated in Line *i* of FIG. 3 by numeral 58.

When F25 is true, all the NAND gates (FIG. 2) of the units 20 are enabled so that the slave counter 15 is tied to the master counter 10 as hereinbefore described. Thus, from time *t2* to time *t5* the slave counter counts the input pulse, however, the counter differs from that in the master counter 10. But at the time *t5* when the slave counter is tied to the master counter via unit 20, the stages of the slave counter 15 adopt the states of their corresponding stages in the master counter 10.

The two counters will contain the same count, which is synchronously incremented by the input pulses, at a time *t7* when the four least significant stages M20 through M23 again enable the gate 45 by providing a true WO output designated by numeral 60. As a result, when the trailing edge of the next input pulse, designated in Line *a* by numeral 62 is received, at *t8*, flip-flop 40 will be driven to a set state to provide a true output on output line F26 (Line *j*) as designated by numeral 64. When flip-flop 40 is driven to a set state, the 0 output which is connected to output line $\overline{F26}$ (see FIG. 1) is false. As a result, the R input of flip-flop 40 is false so that when the trailing edge of a subsequent input pulse, designated by numeral 65, is received by flip-flop 30, the latter mentioned flip-flop is reset.

When flip-flop 30 is rest, the F25 output line thereof is false as indicated by numeral 67, thereby disabling the gating unit 20. As a result, the slave counter 15 is disconnected from the master counter 10. It should be pointed out however, that even though the slave counter 15 is disconnected from the master counter 10 the counts in the two counters are the same since they both respond, or are incremented by, the same input pulses.

The instant at which the count in the master counter is desired is chosen to be synchronized with the trailing edge of a clock pulse. In FIG. 3 this is diagrammed as a time *tx*. Just prior to the trailing edge of such clock pulse, during the period thereof, a T2 signal is supplied to the R input of flip-flop 38. This is designated in FIG. 3 by a time *t10*. As a result, when the trailing edge of the clock pulse is received at time *tx*, the R input of flip-flop 38 is false, driving flip-flop 38 to a reset state as represented by the change of level of F5 from a true to a false state, designated by numeral 69. When F5 is false, gate 36 is disabled so that the slave counter 15 can no longer receive input pulses to be counted therein. That is, at time *tx* the count in the slave counter 15 is identical with that in the master counter 10. However, whereas the master counter 10 is permitted to receive additional input pulses after *tx*, the supply of input pulses to the slave counter is interrupted.

After slave counter 15 settles down, the exact count therein is transferrable by means of its output lines to a readout unit. Such count represents the exact count present in the master counter 10 at time *tx*. However, instead of reading it out from the master counter 10 it is read out from the slave counter 15. In FIG. 3, the end of the T2 pulse is assumed to occur at time *t*11. After time *tx* flip-flop 38 is in a reset state so that two inputs to NAND gate 46 are true providing a false output to the R input of flip-flop 40. Consequently, when the trailing edge of a subsequent input pulse is received at time *t*12, flip-flop 40 is driven to a reset state as indicated by the change of level of F26 from a true to a false level designated by numeral 71.

In the foregoing, the invention has been described in conjunction with logic circuitry whereby the slave counter is supplied with the input pulses before the coupling of the two counters together. Also, both coupling and decoupling of the two counters occurs as a function of a combination of states of selected stages of the master counter, which provide a true WO. Also the decoupling of the counters may in some cases be accomplished by actuating gate 44 with an external control pulse, rather than a true WO signal may be preferable to decouple the counters when the carry propagation time or ripple has died down and all the stages are in a quiescent condition which is sensed by employing gate 45 to provide a true WO signal as a function of stages M20–M23.

The foregoing description of the noninterruptable digital counting system of the invention may be summarized by regarding the system as comprising a master counter 10 to which input pulses IP are supplied, at a rate that the counter cannot be accurately readout between pulses. That is, the maximum time which may be required for the counter to settle down, i.e., the counter's carry propagation time is greater than the period of the input pulses. The system includes a second or slave counter 15, and logic control circuitry.

Initially, the slave counter is disconnected from the master counter and only the master counter counts continuously the input pulses. When the count of the master counter 10 is desired at a fixed instant in time *tx*, prior thereto *t*1 a first control pulse T1 is supplied to the control circuitry. As a result the slave counter is supplied with the input pulses, so that both count the same pulses, even though the counts therein, differ the logic control circuitry includes means to provide a signal which ties the slave counter to the master counter at a time when most stages thereof are in a quescent condition or settled down. In the foregoing example with a 24 bit master counter and a pulse period of 0.25 $\mu$s., after a disturbing or rippling pulse is supplied to the fifth stage M19 which may affect any or all of stages M19 through M0, thirteen pulse periods elapse before the slave counter 15 is tied to master counter 10. That is, the 20 stages M19 through M0 are given $13\times0-25=3.25$ $\mu$s. to settle down which is sufficiently long. This is accomplished by utilizing the outputs of the first four stages M23–M20 to enable gate 45 when the count in the first four stages is 13, occurring thirteen pulse periods after M19 is switched from a set to a reset state, representing the start of the rippling pulse propagating through M19 through M0.

When gate 45 is enabled gate 43 is enabled, setting flip-flop 30 to provide a true pulse F25 which enables gating unit 20. As a result, slave counter 15 is tied to master counter 10 and assumes the count therein. Thereafter, since both counters are supplied with the same input pulse, the counts therein increase synchronously. Thus, the count in the slave counter is identical with the count in the master counter.

Sometimes thereafter, the slave counter is disconneced from the master counter. However, since both respond to the same count the count in both is the same. Once this state is reached, reading out the count in the master counter at any given instant, such as *tx* is accomplished by disrupting the supply of pulses to the slave counter at time *tx*. After the slave counter settles down, the count therein represents the count therein at *x* which is also the count present in the master counter at *tx*.

The reading out may occur at chosen instances or at fixed intervals such as one second. In the latter arrangement after reading out the count from the slave counter at one second, and before the next second, a readout cycle is initiated in which starting with control pulse T1 and ending with *Tz*.

It is approciated that those familiar with the art may make modifications in the arrangements as shown without departing from the true spirit of the invention as claimed in the appended claims.

What is claimed is:

1. A digital counting system comprising:
a first multistage counter;
a second multistage counter;
input means adapted to be connected to a source of a continuous sequence of input pulses;
means connecting said input means to said first counter to continuously count the input pulses supplied thereto;
first logic control means coupled to said second counter and said input means, and adapted to respond to a first control signal to couple said second counter to said input means to count the input pulses supplied thereto;
second logic control means for coupling each stage of said second counter to a corresponding stage in said first counter, whereby the count in the two counters when the two are coupled together and said second counter is supplied with said input pulses is the same; and
control means for controlling said second logic control means to decouple the second counter from said first counter when said first and second counters are supplied with the same input pulses from said input means, whereby the count in both counters is the same and increments synchronously, said first logic control means being further adapted to respond to a second control signal to disrupt the supply of pulses to said second counter at a selected time, after said second counter is decoupled from said first counter, said control means including means for controlling said second logic means to couple said second counter to said first counter when both counters are coupled to said input means to count the input pulses therefrom, and to further control said second logic means to decouple said second counter from said first counter when a selected group of stages of said first counter are in a selected combination of states representative of a quiescent condition of substantially all the stages of said first counter.

2. A digital counting system comprising:
a first multistage counter;
a second multistage counter;
input means adapted to be connected to a source of a continuous sequence of input pulses;
means connecting said input means to said first counter to continuously count the input pulses supplied thereto;
first logic control means coupled to said second counter and said input means, and adapted to respond to a first control signal to couple said second counter to said input means to count the input pulses supplied thereto;

second logic control means for coupling each stage of said second counter to a corresponding stage in said first counter, whereby the count in the two counters when the two are coupled together and said second counter is supplied with said input pulses is the same; and control means for controlling said second logic control means to decouple the second counter from said first counter when said first and second counters are supplied with the same input pulses from said input means, whereby the count in both counters is the same and increments synchronously, said first logic control means being further adapted to respond to a second control signal to disrupt the supply of pulses to said second counter at a selected time, after said second counter is decoupled from said first counter, said first logic control means including an AND gate, and a first control flip-flop having first and second states, means connecting said flip-flop to one input of said AND gate, means connecting a second input of said AND gate to said input means, and means connecting the output of said AND gate to said second counter, said flip-flop being switchable to said first state in response to said first control signal to enable said AND gate, and being further switchable to said second state in response to said second control signal to disable said AND gate so as to disrupt the supply of input pulses to said second counter.

3. The digital counting system as recited in claim 2 wherein said control means includes a second control flip-flop having first and second states, and means coupling said control flip-flop to said second gating means to couple each stage of said second counter to a corresponding stage in said first counter when said second control flip-flop is in said first state and decouple said counters from one another when said second control flip-flop is in said second state, and means for controlling the state of said second control flip-flop.

4. A noninterruptable digital counting system comprising:

a master $n$ stage binary counter;

a slave $n$ stage binary counter;

input means, adapted to be connected to a source of a continuous sequence of input pulses;

means for directly connecting said master counter to said input means to cause said master counter to count input pulses supplied thereto from said input means;

a first gate connected between said input means and said slave counter;

a first bistable element connected to said firt gate for enabling said gate to pass input pulses therethrough to said slave counter when said first element is in a first state in response to a first control signal adapted to be received thereby, said first gate being disabled to disrupt the supply of input pulses to said slave counter when said first element is in a second state in response to a second control signal adapted to be received thereby;

gating structure means connected to the $n$ stages of said master counter and to the $n$ stages of said slave counter for coupling each stage of said slave counter to a corresponding stage in said master counter to assume the binary state of the stage of the master counter in response to a coupling control signal and for decoupling each of the $n$ stages of said slave counter from its corresponding stage in said master counter in response to a decoupling control signal; and logic control means including a second bistable element connected to said gating structure for providing said coupling and decoupling control signals thereto when said second bistable element is in a first stable state or a second stable state, respectively, said logic control means includes a second gate connected to a selected number of stages of said master counter to drive said second bistable element to at least said second stable state when said selected number of stages are in a selected combination of binary states.

5. The noninterruptable digital counting system as recited in claim 4 in which said logic control means includes at least a third gate connected to said first bistable element and said second gate for driving said second bistable element to the second stable state thereof only when said first element is in said first state and second selected number of stages are in said selected combination of binary states.

6. The noninterruptable digital counting system as recited in claim 5 wherein said logic means includes a fourth gate connected to said first element and said second gate for driving said second element to its first stable state when said first element is in said first state and said selected number of stages are in said selected combination of binary states.

References Cited

UNITED STATES PATENTS

| | | | |
|---|---|---|---|
| 3,064,889 | 11/1962 | Hupp | 235—92 |
| 3,268,713 | 8/1966 | Klinikowski | 235—92 |
| 3,340,386 | 9/1967 | Hurst | 235—92 |
| 3,392,270 | 7/1968 | Boucke | 235—92 |
| 3,393,298 | 7/1968 | Olson | 235—92 |
| 3,420,988 | 1/1969 | Hunt et al. | 235—92 |

MAYNARD R. WILBUR, Primary Examiner

C. D. MILLER, Assistant Examiner